UNITED STATES PATENT OFFICE.

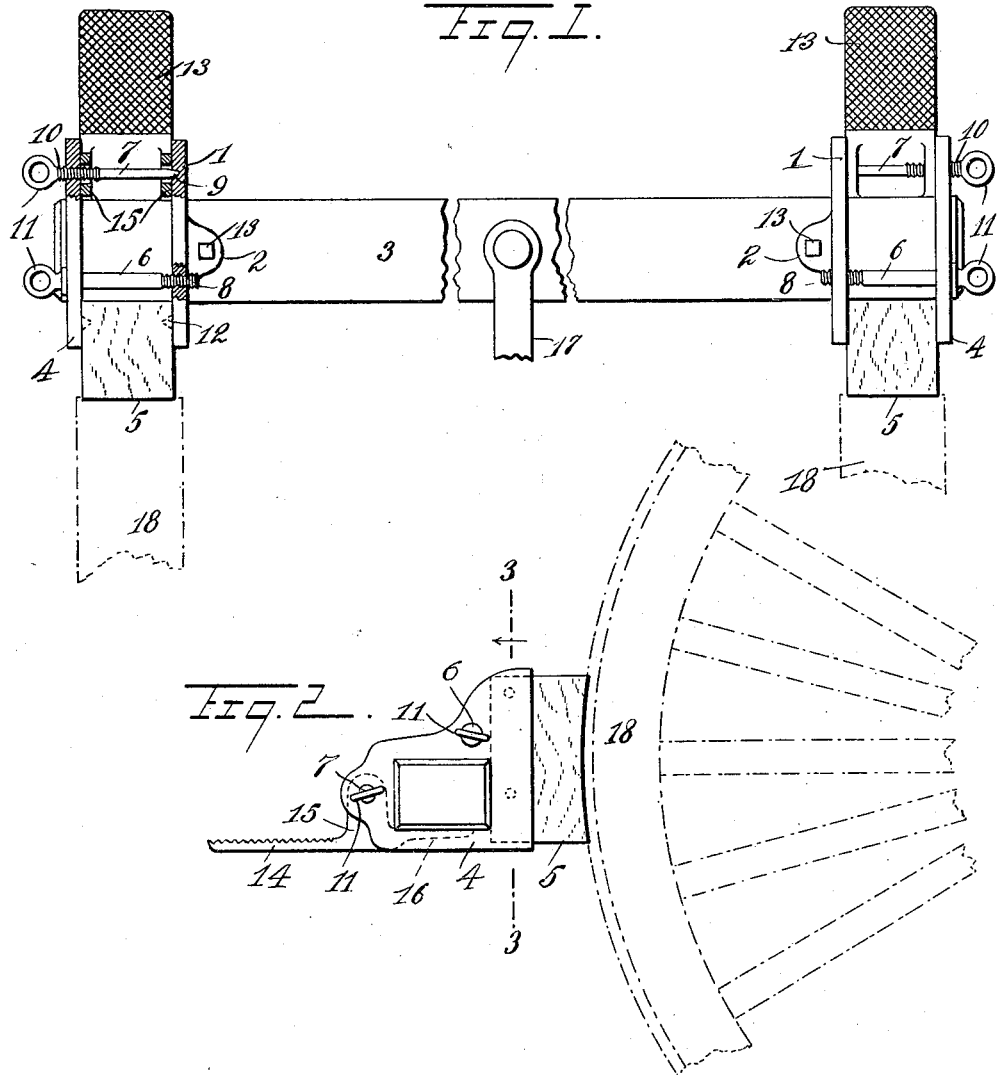

PAUL KRUEMLING, OF MAHER, COLORADO.

BRAKE-BLOCK HOLDER.

1,134,872.  Specification of Letters Patent.  Patented Apr. 6, 1915.

Application filed November 18, 1913. Serial No. 801,628.

*To all whom it may concern:*

Be it known that I, PAUL KRUEMLING, a citizen of the United States, and a resident of Maher, in the county of Montrose, and State of Colorado, have invented a new and Improved Brake-Block Holder, of which the following is a full, clear, and exact description.

My invention relates to a holder for brake blocks or shoes, and the object thereof is to provide a device of this kind which is simple in construction, which will permit of the utilization of any kind of a block to form the brake shoe, and which can be readily mounted upon the beam by means of which the brakes are applied.

Reference is to be had to the accompanying drawings forming a part of this specification, in which the same characters of reference indicate the same parts in all the views.

Figure 1 is a top plan, showing the manner in which the blocks are secured to the brake beam by my holder, part of the holder being shown in section; Fig. 2 is a side elevation of the holder; and Fig. 3 is a sectional view on the line 3—3 of Fig. 2.

My holder comprises a plate 1 having a central opening to enable it to be fitted upon the brake beam, and a lug 2 which is perforated so that the plate and the brake beam 3 can be fastened securely together. The holder also comprises another plate 4 which also has a central opening to receive the end of the brake beam, and these two plates are held together by suitable screws, to be presently described, in such a way as to clamp the brake shoe or block 5 between their ends. Two holders will of course be employed, and one will be mounted on each end of the brake beam 3, so as to apply the brakes to the wheels on each side of the vehicle.

The plates 1 and 4 are held together by means of screws or eye-bolts 6 and 7, the former being located adjacent the ends which grip the block 5, and the latter at the opposite ends of the plates 1 and 4. The screw 6 has its outer end threaded as shown at 8, and this end 8 has screw-threaded engagement with a threaded aperture in the plate 1, the opposite end of the bolt having a head or flange thereon and being smooth, passing through a smooth opening in the plate 4 in alinement with the threaded opening which engages the threaded end 8. The other bolt 7 has one end tapered as shown at 9, this end fitting into a recess on the inner face of the plate 1. This bolt is also provided with screw-threads 10 near its opposite end which engage with a threaded opening in the plate 4 in alinement with the recess which receives the tapered end 9. Both bolts terminate in eyelets 11 in the outer face of the plate 4. The plates also have points or barbs 12 on their inner faces, and when the bolts 6 and 7 are screwed home these barbs are forced into the block which is gripped between the plates 1 and 4, and held in position. The bolt 6 draws the ends of the plates having the barbs 12 together, exerting a tensile stress to do so, while the other bolt 7 keeps the opposite ends of the plates 1 and 4 spaced apart, owing to the recess in the plate 1 and the threaded engagement of this bolt with the plate 4, as will be readily understood. In this way the block 5 forming the brake shoe is firmly secured between the two plates, and as the brake beam passes through the alined openings in these plates there is little likelihood of any of the parts getting out of position.

Each of the holders carrying a brake shoe 5 is secured to the beam by means of a bolt 13, which passes through the lug 2 in the plate 1. This lug prevents the plates 1 and 4, with the blocks 5, from slipping off the end of the beam 3 on which the parts in question are mounted.

The holder can be used on any form of wagon or vehicle, and for spring wagons I prefer to make use of a step 14 mounted upon the brake holder by means of perforated lugs 15 arranged to fit between the plates 1 and 4 and be supported by the bolts 7.

16 is an arm which forms part of the step 14 and engages the under side of the brake beam to hold the step 14 in horizontal position. The brake beam is actuated by the draw bar 17, and when so actuated the brake shoes 5 are applied to the rims of the wheels 18 in the ordinary way.

From the above description it will be seen that I have devised a very simple and practicable construction of brake shoe holder that is easy and cheap to make and to mount in place. It is of great utility when employed upon wagons designed for rough country, wherein a frequent use of the brakes with much wear upon the brake blocks is necessary. Whenever one of the brake blocks or shoes 5 wears out another can be substituted merely by loosening the bolts 6 and 7.

The eyelets 11 are provided so that the bolts 6 and 7 can be engaged by a suitable tool to be tightened or loosed.

Having thus described my invention, I claim as new and desire to secure by Letters Patent:

1. In an improvement of the kind described, the combination with a brake beam, of brake shoe holders each comprising a pair of plates having openings for mounting the same upon the ends of the beam, means for fastening one of the plates of each pair to the beam, means engaging each pair of plates near one end to draw the said ends of the plates toward each other, brake shoes held between said ends of the plates, a bolt engaging each pair of plates near the opposite ends thereof to force the said ends apart, and steps mounted on the said bolts.

2. In an improvement of the kind described, the combination of a pair of plates, a screw bolt passing loosely through one of said plates and having screw-threaded engagement with the other to draw one end of each of said plates together to grip a block between them, and an additional screw bolt having screw-threaded engagement with the first of said plates and abutting against the second of said plates to force the opposite ends of said plates apart, said plates having central apertures therethrough to enable the same to be mounted upon a support, and one of said plates having an apertured lug adapted to engage said support and to be secured thereto to enable the plates to be retained in position.

3. The combination of a brake shoe holder mounted upon a brake beam, and a step having perforated lugs arranged between the members of the holder and pivotally mounted thereon, the step having an arm to engage the under side of the beam to support the step in horizontal position.

4. The combination of a plate having an opening therethrough and a perforated lug adjacent said opening to receive a fastening bolt, said plate also having a screw-threaded aperture and a recess, another plate likewise having an opening therethrough to be in alinement with the first-named opening in the first plate and also having a smooth opening to be in alinement with the threaded opening in the first plate, and a screw-threaded opening to be in alinement with the recess in the first plate, said plates having projections from their inner faces at one end to engage a brake shoe, and bolts having threaded portions to draw the ends of the plates having the barbs together and force the opposite ends of said plates apart.

5. The combination with a brake beam, a brake shoe holder comprising members mounted upon the end of the brake beam, and means for securing said members together, of a brake shoe held between said members at one end thereof, and a step pivotally mounted between the said members of the brake shoe holder at the other end thereof.

6. The combination with a brake beam, a brake shoe holder comprising members mounted upon the brake beam, and bolts engaging said members to cause the same to grip a brake block between them, of a step having perforated lugs arranged between the members of the brake shoe holder, the said lugs being pivotally mounted on one of the said bolts of the brake shoe holder, and an arm on said step adapted to engage the underside of the brake beam when the step is in horizontal position.

In testimony whereof I have signed my name to this specification in the presence of two subscribing witnesses.

PAUL KRUEMLING.

Witnesses:
JAMES TEESLINK,
GEO. L. TRACY.

Copies of this patent may be obtained for five cents each, by addressing the "Commissioner of Patents, Washington, D. C."